US009047378B1

(12) United States Patent
Bakshitz

(10) Patent No.: US 9,047,378 B1
(45) Date of Patent: Jun. 2, 2015

(54) SYSTEMS AND METHODS FOR ACCESSING A MULTI-ORGANIZATION COLLECTION OF HOSTED CONTACTS

(71) Applicant: Google Inc., Mountain View, CA (US)

(72) Inventor: Offir Bakshitz, Redmond, WA (US)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 13/629,890

(22) Filed: Sep. 28, 2012

Related U.S. Application Data

(60) Provisional application No. 61/542,067, filed on Sep. 30, 2011.

(51) Int. Cl.
*G06F 17/30* (2006.01)

(52) U.S. Cl.
CPC ............................... *G06F 17/30864* (2013.01)

(58) Field of Classification Search
CPC ..... G06F 17/50; G06F 17/211; G06F 17/243; G06F 17/30539; G06F 17/30557; G06F 17/30598; G06F 17/30864; G06F 17/30867; G06F 17/30964
USPC .................................................. 707/758, 769
See application file for complete search history.

(56) References Cited

U.S. PATENT DOCUMENTS

| 2009/0234970 | A1* | 9/2009 | Sun ............................... 709/245 |
| 2010/0114944 | A1* | 5/2010 | Adler et al. ................... 707/770 |

OTHER PUBLICATIONS

Chang et al., "Bigtable: A Distributed Storage System for Structured Data", to appear in OSDI 2006, pp. 1-14.
Chang et al., "Google Bigtable", presentation for UWCS OS Seminar Discussion, Erik Paulson, Oct. 2, 2006, pp. 1-19.
Dean et al., "MapReduce: Simplified Data Processing on Large Clusters", to appear in OSDI 2004, pp. 1-13.
Dean et al., "MapReduce:Simplified Data Processing on Large Clusters", pp. 1-32, downloaded from internet, http://labs.google.com/papers/mapreduce-osdi04-slides/index.html[Sep. 20, 2011 2:16:26 PM].
O'Neil et al., "The Log-Structured Merge-Tree (LSM-Tree)", 1996, pp. 1-32.

* cited by examiner

*Primary Examiner* — Apu Mofiz
*Assistant Examiner* — Fariborz Khoshnoodi
(74) *Attorney, Agent, or Firm* — McDermott Will & Emery LLP

(57) ABSTRACT

A host service holds a collection of contacts for multiple organizations, or domains. The system maintains an index made of one or more tables. The index may be sorted across multiple machines. Each table contains a set of elements, and each element points to a subset of the contacts that share a common attribute. When the system receives query to return at least one of the contacts in the collection, the system accesses the index to identify a first element having a domain that matches the domain of the first query and an attribute that matches an attribute value of the query. In response, it returns the contacts to which the first element points.

21 Claims, 9 Drawing Sheets

SYSTEMS AND METHODS FOR ACCESSING A MULTI-ORGANIZATION COLLECTION OF HOSTED CONTACTS

RELATED APPLICATIONS AND CLAIM OF PRIORITY

This patent document claims priority to U.S. Provisional Patent Application No. 61/542,067, filed Sep. 30, 2011, the disclosure of which is incorporated herein by reference in its entirety.

BACKGROUND

The present disclosure relates to sets of contacts maintained for numerous organizations. In particular, it relates to methods and systems for searching and/or browsing large sets of contacts with quick response times.

Document management requires improved techniques to provide access to large data sets in short time periods. For example, some services may maintain profiles and contacts information for more than 1 million hosted domains. A very large domain data set may include profiles and contacts that exceed 200 million. A very large set of profiles and contacts may exceed 1 billion items. A large data set may be smaller than this, but in any such case the process of searching through a contact list or set of profiles may be extremely slow.

SUMMARY

In an embodiment, a host service system includes a processor, a computer-readable memory, and a collection of contacts. Each contact is associated with a domain, and the collection comprises contacts from a plurality of domains. The system maintains, by an index interface, an index comprising one or more tables. Each table contains a plurality of elements. Each element is associated with a domain and points to a subset of the contacts that share a common attribute. The system receives, via the host service, a first query to return at least one of the contacts in the collection, wherein the first query includes a domain and a first attribute value. The system accesses the index to identify a first element having a domain that matches the domain of the first query and which is associated with a common attribute that matches the attribute value of the first query, and in response to the first query it returns the contacts to which the first element points.

In some embodiments, the first attribute value comprises a plurality of characters, and the system may also receive, by the host service, a second query to return at least one of the contacts in the collection. The second query comprises the first attribute value plus an additional character. The system may access the index to identify a second element having a domain that matches the domain of the query and which is associated with a common attribute that matches the first attribute value plus the additional character; and in response to the second query, it may return the contacts to which the second element points.

In some embodiments, the host service may also receive a third query that comprises at least a threshold number of characters. If so, it may access the index to identify a third element having a domain that matches the domain of the query and an attribute that matches the characters in the third query. It may also access a remote collection of contacts to identify an additional group of contacts having an attribute that matches the characters in the third query. In response to the third query, the system may return the contacts to which the third element points and the additional group of contacts identified from the remote collection. Collectively, these contacts may comprise a complete set of all contacts that match the third query.

In some embodiments, the first query comprises a browsing request. If so, the system may also return, in response to the first query, a plurality of selectable ranges within the returned contacts. It may also receive a selection of one of the selectable ranges from a client device, and in response to the selection it may return a subset of the returned contacts that correspond to the selected range. If the first value comprises a page number, the system may cause a client device to display the returned contacts starting on the page number that corresponds to the first attribute value.

In some embodiments, the system may generate the index by processing the contacts in the collection to identify all contacts that correspond to a first domain; grouping all contacts that correspond to the first domain into a first subset; processing the contacts in the first subset to identify all contacts having a data field whose first character values are identical; grouping the contacts having a data field whose first character values are identical into a second subset; processing the contacts in the second subset to identify all contacts whose first two character values in the data field are identical; grouping the contacts having a data field whose first two character values in the data field are identical into a third subset; and saving the first, second and third subsets as tables in the index.

In some embodiments, when saving the index the system may partition the index into a plurality of logical storage units and save the index across multiple storage devices.

In some embodiments, each of the elements comprises a key that is associated with a domain and a key-value. Some of the key-values may include a prefix that corresponds to first set of characters within a profiled data field for a plurality of the contacts in the collection. Some of the key-values may include a term that corresponds to a full value of a profiled data field for a plurality of the contacts in the collection.

Particular aspects of one or more implementations of the subject matter described in this specification are set forth in the drawings and the description below. Other features, aspects, and advantages of the subject matter will become apparent from the description, the drawings, and the claims.

BRIEF DESCRIPTION OF THE DRAWINGS

FIG. 7 illustrates the directory. In FIG. 8, the user selects the directory. Responsive to this selection, in FIG. 9, the user receives a table of selectable browsing ranges.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Figure 1:
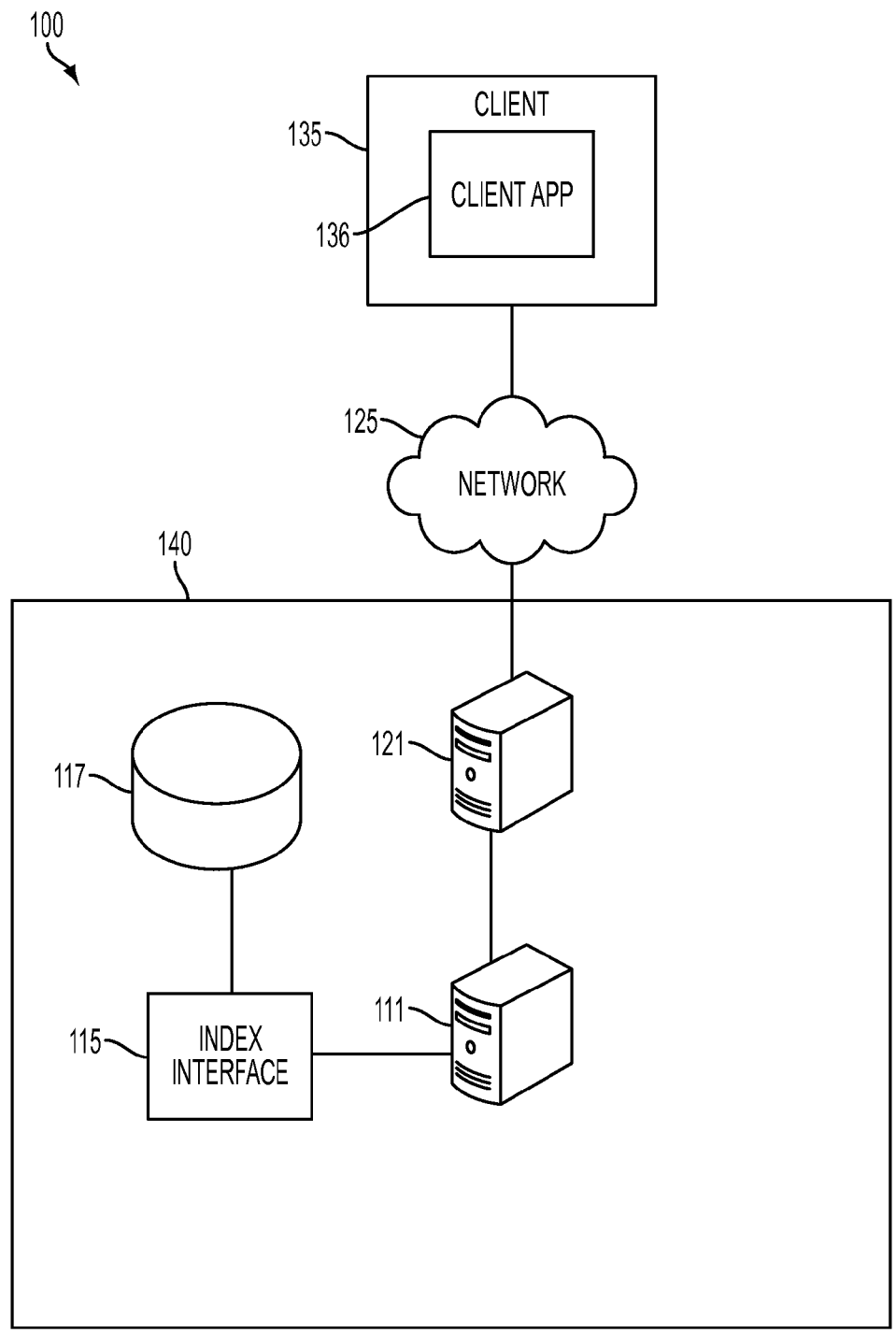
FIG. 1 depicts an architecture that may be used for queries into profiles contained in large contact data sets.

FIG. 1 depicts a system architecture 100 that may be used for queries or browsing requests into very large sets of user profiles, which may be referred to in this document as "contacts." A contact or user profile contains data that others may use to identify and contact a person or entity by audio conference, video conference electronic messaging. User profile data may include data fields such as name, address, phone number, e-mail address, social networking service username, video conferencing service ID, and/or other identifying information. As used in this document, a "query" is a command or other input received by a client application that seeks a response that includes one or more contacts that match the query. A "browsing request" is a request to browse a list of multiple contacts in a particular data set, such as all contacts that are in an individual user's contact list, or all contacts that are in the contact lists of a group of users who are employed by a particular organization.

FIG. 1 depicts a client device 135 that hosts a client software application 136 such as a browser or dialer module. The client device 135 includes a processor, a computer-readable memory, and a communications device such as a transceived or communication port. The client device 135 is in electronic communication with a network 125. On a host side 140 of the connection, one or more servers and one or more databases respond to queries received from the client device. A front end server 121 may receive and process an HTML or other query. More generally, the front end server 121 interacts with the client device 135. The front end server 121 also may communicate with a backend server 111. The backend server 111 translates the query from the client device to an internal query format. This separates the graphic user interface technology from the internal database technology. It facilitates separate evolution of front end and backend systems.

The host system 140 also includes an index interface 115, which is a server or other device having a computer-readable memory that contains a an index data structure with data corresponding to groups of contacts that are resident in the contacts database 117. Optionally, the index interface may be a software module that is resident on one of the servers (such as backend server 111), or it may be the server that contains the contacts database 117. Responding to queries for contacts, the index interface server causes the contacts to be retrieved from the contacts data set 117.

The front end server, back end server and index interface server all include memory for storage of data and software applications, a processor for accessing data and executing applications, and components that facilitate communication over the communication network 140. While the figure shows these servers as separate machines, this disclosure includes implementations that combine multiple features onto platforms with shared functions and implementations that spread single features across multiple platforms. With load balancing, the platforms used for particular functions may change over time.

The contacts in the data set 117 may be a collection of contacts from multiple organizations. For example, the host system 140 may host sets of contacts for multiple corporations, educational institutions, health care providers, and/or government agencies. Each such entity will be assigned or associated with an identifier, referred to in this document as a "domain." Each contact will be stored in the data set in association with its domain, so that the domain affiliation of each contact is known.

The index interface 115 contains a logical structure, such as a table of key-value pairs or other elements, that points to a set of contacts in the data set 117. Each element in the index table is a unit or group of units of data that serves as a map for (i.e., points to) one or more units of data (e.g., contacts) in the data set. The index may contain several types of keys, each of which assists in various types of queries. For example:

(1) A key may be in the form of a tuple (search, domain, prefix). The "search" portion may be one or more bits that identify the key as a search operation. The domain may be an identifier that identifies the domain or domains for whose contacts the user is authorized to query. The "prefix" portion may be a first portion of a searchable attribute (i.e., data field) with user profile data, such as the first two (or three or more) letters of the contact's first or last name, the first few digits of the contact's phone number, the first few characters of the contact's social networking username, or another data field. The prefix is typically shorter than the full data field, although this may not be the case for each contact in the data set. A prefix will enable the key to retrieve all contacts having profile data that matches the prefix. Each prefix may yield one or more matches in the database. For example, if a domain-profile has a first name of "John", the prefixes "J', "Jo", "Joh" and "John" may retrieve all contacts having a user name that includes "John." A prefix such "J" also may retrieve names such as "James", "Jack" and "Joseph", while a prefix such as "Jo" would eliminate the first two of those three names.

(2) A key may be in the form of a tuple (search, domain, ID). Here, the "ID" portion of the key may be a unique identifier for a particular domain in the data set. This type of key will point to and retrieve all contacts associated with the domain that matches the ID.

(3) A key may be in the form of a tuple (search, domain, term). Here, the "term" portion of the key may be a valid full search term, such as a surname, first name, city of residence, or other searchable attribute of a profile. This type of key will point to and retrieve all contacts having data that matches the term.

The index may include other types of keys that assists in browsing through lists of contacts. For example, for a key in the form of a pair (browse, domain), the "browse" portion may be one or more bits that identify the key as a browsing operation. The "domain" may be an identifier that identifies the domain or domains whose contacts the user is authorized to query. When this key is accessed, it will return a list of all contacts in the database that are associated with the domain. A browse request may include additional values, such as a page number or a starting character, in which case a key in the form of a combination such as (browse, domain, page-number) may be used.

Segments of the index may be partitioned into multiple logical storage units and thus stored across multiple machines. Each storage unit may contain a list of key-value combinations (e.g., pairs or tuples, as described above). The storage units may be geographically distributed to be near the known geographic location of a set of users. For example, all contacts associated with a particular corporate entity may be stored in a location that is (a) within a predetermined distance from the entity's corporate headquarters, or (b) the closest available location to the entity's corporate headquarters. In such a situation, the system may include multiple indices, each of which is also stored near the known geographic location. Example locations may include the location where the contacts are stored, or at the entity's location itself.

In some embodiments, a domain-centric index may return contacts within the domain of the index in response to queries of a shorter number of characters, but only begin to consider contacts from other domains in response to a longer query. For example, when responding to a query containing no more than a threshold number of characters, the system may only access a local or first-priority index and/or data set, but when responding to a query containing more than the threshold number of characters, the system also may consider other indices and/or data sets. The concepts of "short" and "long" as used in this paragraph are relative to each other, and merely require that the long query contain at least a threshold number of characters, while short queries are limited to those having a character length that is less than the threshold.

When it receives a query request, the index interface may hash the query request to identify the machine that hosts the relevant index segment. Using this approach, even a very large data set of contacts can be maintained solely in random access memory, and queries may be answered without requiring disk access to the data set as stored on a hard drive. Although not a required element of the invention, eliminating the need for disk access keeps queries for individual contacts fast, in some embodiments retrieving results in under one second.

When an index is built, it may become static and not updated or revised until it is replaced with a new index. Using distributed database technology, the index may be periodically rebuilt after a predetermined period of time, after a predetermined number of contact changes have been made to the database, or after some other milestone event has occurred or command has been received. Suitable distributed table technologies for handling large data sets may include those known as BigTable and SSTable. Such data structures are described in Chang et al., "BigTable: A Distributed Storage System for Structured Data," published by Google, Inc. (2006).

Figure 2:
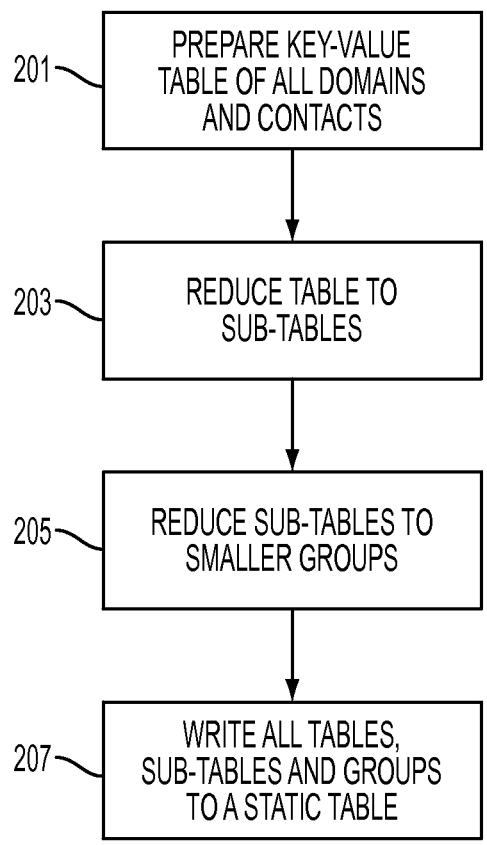
FIG. 2 shows a sequence of actions that may be used to generate an index of profiles.

FIG. 2 illustrates a process by which an index may be created in accordance with various embodiments. First a set of contacts may be processed 201 to produce a key-value table containing all domain profiles, along with all contacts for each domain. The table is then processed to produce one or more additional tables containing subsets of the entries 203. For example, one sub-table may include key-value combinations for all possible contacts within a domain. Another sub-table may include key-value combinations for another searchable attribute's particular value. Each sub-table may be further processed into any number of smaller groups, each of which shares a common domain, identifier, attribute portion, or other feature. The processing may be performed using a map-reduce function or similar function. All groups and tables are then combined into a single, static set 204 which is saved as the index in one or more locations.

Figure 3:
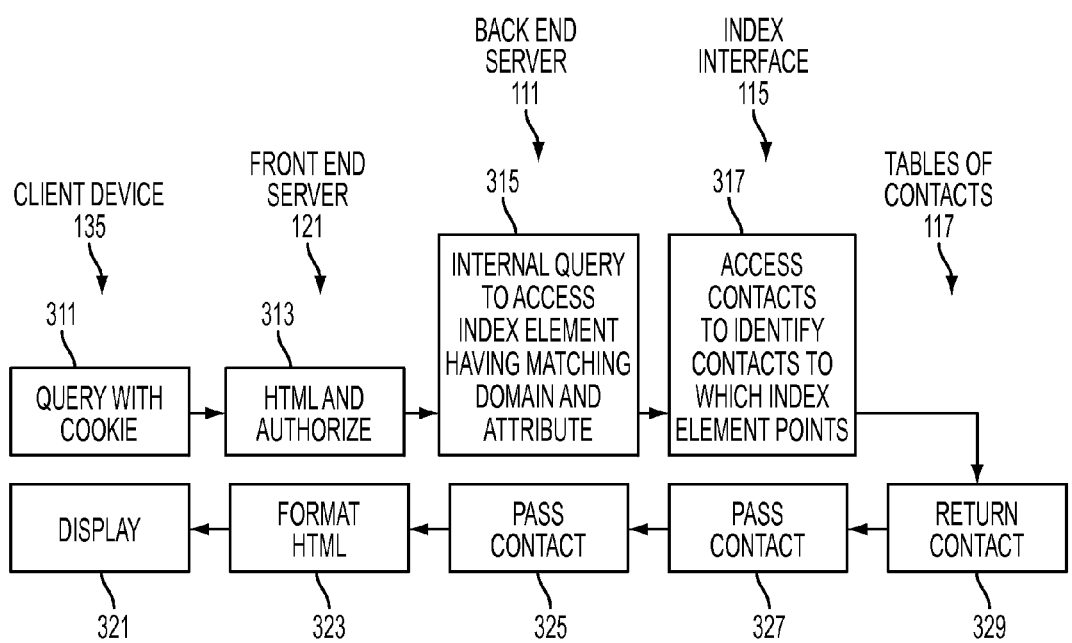
FIG. 3 shows a sequence of actions for retrieving one or more profiles in response to a query.

FIG. 3 shows a sequence of actions that the system may follow to retrieve a profile or contact in response to a query. The information flow depicted in FIG. 3 shows various actions by the elements of FIG. 1, and proceeds from a client device 135, to a front end server 121, to a backend server 111, to an index interface server 115, to data storage of a data set of contacts 117 and back through the same connections to the client device 135. A query begins with a software application or the client device sending a query 311 optionally with a cookie or other identifying code or file, to the front end server. The front end server 121 processes the HTML or other client/server message, checks the user's authorization to execute the query 313 and forwards a version of the query to the backend server 111. The backend server 111 generates an internal query 315 from the input provided by the front end server. The internal query accesses the index interface server 115 to identify an index element having an associated domain and attribute matching those of the query 315. The index interface server 115 then accesses the contacts 317 to which the index element points. It accesses the contacts table of contacts 117 and returns contacts 329 from data storage. The returned contacts are passed 327 to the index interface and passed 325 through the backend server to the front end server. The front end server formats the results in HTML or other client/server format 323 and sends them to the client device. The returned results may be a complete, sorted set of all results that match the query. The client device 135 displays or causes the results to be displayed 321 or otherwise output to a user (such as via an audio output).

Figure 4:
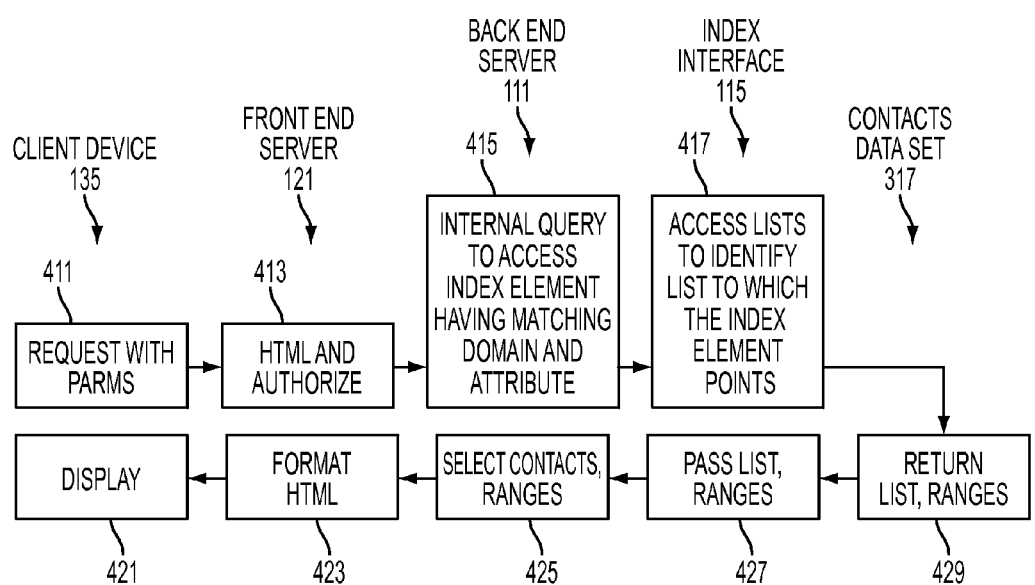
FIG. 4 shows an example of a browsing request, followed by a navigation request.

FIG. 4 shows an example of a browsing request, followed by a navigation request. This flow contains elements similar to those shown in FIG. 3, but differences are emphasized, instead of repeated. The information flow depicted in FIG. 4 also shows various actions by the elements of FIG. 1, and proceeds from a client device 135, to a front end server 121, to a backend server 111, to an index interface server 115, to data storage of a data set of contacts 317 and back through the same connections to the client device 135. The result of browsing through pages of a large data set is different and not practically attainable with a hashed index of individual contacts. Rather, a list is retrieved from a table of contact lists 317. A browsing request 411 is accompanied by parameters. In one embodiment, mandatory parameters may include a domain and a list type. Optionally, the user preference for a number of contacts per display page can be specified. As a browsing option, the starting page number of the browse can be indicated. Alternatively, a string could be used to specify where the browsing is to begin. A number of techniques are available to convert a string into a beginning page number for browsing, including the high level index binary search described above. As another browsing option, a number of pages of contacts could be specified.

Client device sends request with parameters 411 the front end server. The processing of HTML 413 and generation of an internal query 415 to access an index element having a matching domain and attribute is essentially as described above. The internal query is sent to an index interface server 115 which accesses lists 417 in the tables list 317, instead of accessing individual contacts to identify a list to which the index element points. From the tables of lists, at least one page of the list is returned along with data regarding one or more ranges of values available on one or more pages of the list. These list pages and ranges are passed 427 to the backend server 111, which selects contacts and rain information 425 to be returned is responsive to the request. The selected information is sent to the front end server 121, which formats it into HTML or another client/server format and sends it to the client device's display 421 or other output.

The display 421 of a browsable list may include browsing controls that are not applicable to search functions. The browsing controls enable a user to move forward or backward by one or more pages and also take advantage of the range information provided to select a particular page. The range information action also may be used to enter a page number as the next browsing destination.

Figure 5:
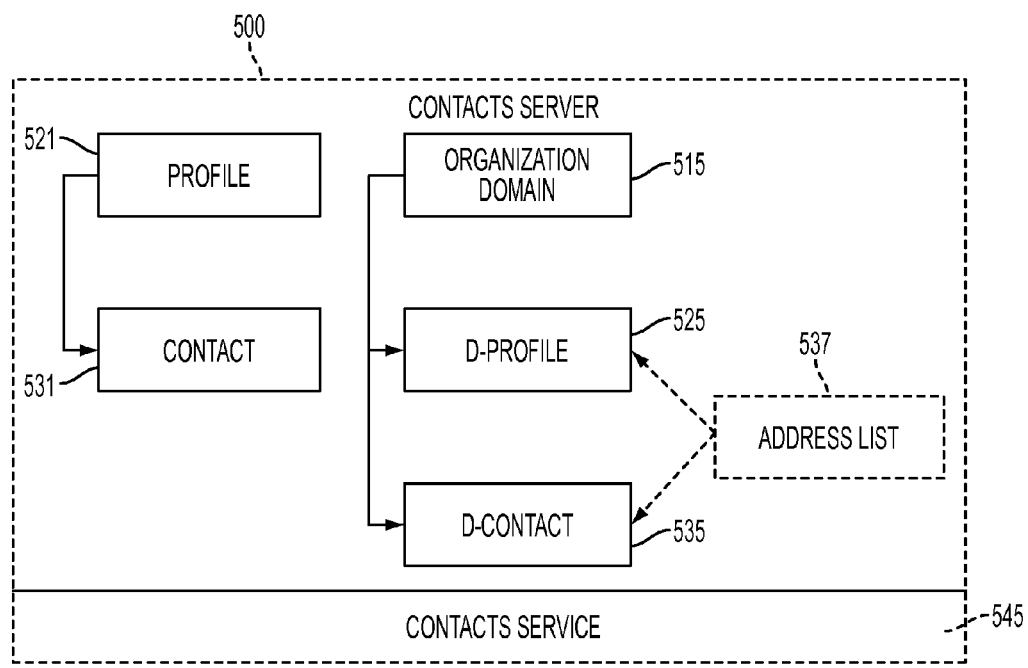
FIG. 5 is an example of a data organization that may be used with this architecture.

FIG. 5 is an example of a data organization that may be used with the disclosed embodiments. In the data organization illustrated by FIG. 5, users are represented by profiles 521, 525. A user may belong to an organization 515. The organization can be identified by any unique identifier. A uniform reference locator (URL) is one convenient organization identifier that assigns an organization's contacts a domain. In this context, a qualified domain is sometimes called a sub-domain. A user typically has a list of contacts 531. An organization also has domain contacts 535, in addition to domain profiles 525. Optionally, domain users could have their own domain contact lists.

The profiles and contacts of individuals and domains are hosted on a contacts server 500. The contacts server includes memory for storage of data and software applications, a processor for accessing data and executing applications, and components that facilitate communication over the communication network 125. The contacts server 500 is accessible via a contacts service 545. This disclosure treats the contacts service interface as positioned at the back end server 111, but it could be positioned at the front end server or the index interface server, depending on the package of features considered to be part of the contacts service 545.

These list types define a set of search results and a sort order for presenting the results. The lists are precompiled, compressed and stored in one or more static indexes of key-value pairs. The key includes the domain, a list type and a starting point, such as a page number or first letter. The associated value for a key is a page of search results for the particular domain and list type. A request includes the ingredients of a key and, optionally, some or all of a number of contacts per page, a starting point and a number of contacts requested. If no starting point is specified, a value is supplied or inferred. In some implementations, a starting point for browsing can be specified as a name or a partial name—a prefix.

Pre-compiling results into static lists enables browsing of list sections with request to display times of under one second. This strategy involves a potentially expensive process of recompiling and restaging updated lists. Depending on the tolerable update latency, the index may be recompiled one or more times a day. Sort orders can, for instance, use last name or first name or department as the primary sort key. List types can include an entire organization, a department or location within an organization, or another pre-selected grouping.

Referring back to FIG. 5, lists are new data structures for browsing that are not needed for queries against individual names or prefixes. For instance, a domain's address list 537 may be maintained using the browsing technology disclosed.

In one example, the address list 537 includes all of the domain profiles 525 and domain contacts 535 within an organization 515. In this example, the address list is sorted by <last name>, <first name>. Other contact information in the address list are <office phone>, <address> and <department>. For purposes of illustration, suppose that a page of contacts in the address list is 250 contacts. Of course, another number of contacts could be included on a page, such as 100, 200 or 500 contacts. Then, the key to the address list would be <organization domain> concatenated with <address list type> and with . The  part of the key would be internal to the back end server and index interface server, which would use the page number to select part of the index to return, in response to a query for the address list. The values returned in response to a request for one page of the address list would include 250 contacts organized by last and first name along with the precompiled contact information. This large set of contacts and associated information is the value associated with a key that specifies a domain, list type and page number.

The index of lists that includes this specific address list is distributed across multiple machines. In some implementations, the initial machine to contact for a page of the address list would be selected by hashing on the <organization domain> concatenated with <address list type> and with . A range of pages would be retrieved by enumerating the specific pages requested. In some implementations, a high level index would be maintained that would correlate ranges of values with particular page numbers, so that the starting page number for browsing could be determined from the high level index and a query string. As many as a billion contacts could be maintained on 4,000,000 pages of a list, at 250 contacts per page. A high level index could indicate the range of values found on each of the 4,000,000 pages, thereby allowing enumeration of a hash key and direct hashing to the right machine where browsing would begin.

Alternatively, a binary or other search could be performed to find the right page. For instance, a list of 1,000,000 contacts could be arranged across 4,000 pages. The index interface server would begin by querying for the range of values on page 2000. This range of values might be maintained on the server that includes page 2000 and in a more compact format than a full page of 250 contacts. The direction followed by a binary search would depend on comparison between the returned range of values for page 2000. The next request might be for page 1,000 or page 3,000.

Figure 6:
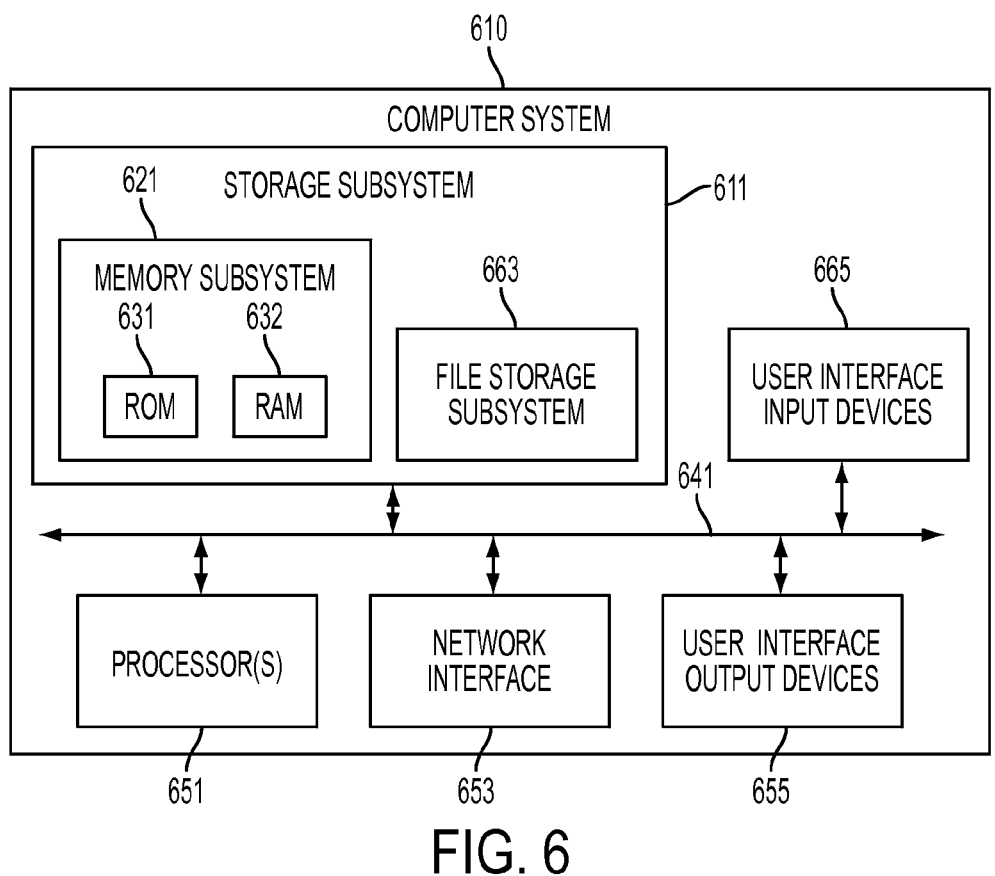
FIG. 6 is a block diagram of elements of a computer system on which the various systems in this document could be implemented.

FIG. 6 is a block diagram of a computer system on which the various systems described above could be implemented. Computer system 610 may include at least one processor 651, which communicates with a number of peripheral devices via bus subsystem 641. These peripheral devices may include a storage subsystem 611, comprising for example memory devices 631, 632 and a file storage subsystem 623, user interface input devices 625, user interface output devices 655, and a network interface subsystem 653. The input and output devices allow user interaction with computer system 610. Network interface subsystem 653 provides an interface to a communication network and is coupled via the communication network to corresponding interface devices in other computer systems. The communication network may comprise many interconnected computer systems and communication links. These communication links may be wireline links, optical links, wireless links, or any other mechanisms for communication of information. In one implementation, the communication network attached to the interface is the Internet. In other implementations, the communication network may be any suitable computer network.

User interface input devices 625 may include a keyboard; pointing devices such as a mouse, trackball, touchpad, or graphics tablet; a scanner; a touchscreen incorporated into the display; audio input devices such as voice recognition systems or microphones; and other types of input devices. In general, use of the term "input device" is intended to include possible types of devices and ways to input information into computer system 610 or onto the communication network.

User interface output devices 655 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 610 to the user or to another machine or computer system.

Storage subsystem 611 stores programming and data constructs that provide the functionality of some or all of the modules described throughout this disclosure. These software modules are generally executed by processor 651 alone or in combination with other processors.

Memory 621 used in the storage subsystem can include a number of memories including a main random access memory (RAM) 632 for storage of instructions and data during program execution and a read only memory (ROM) 631 in which fixed instructions are stored. A file storage subsystem can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 623 of the storage subsystem 611, or in other machines accessible by the processor.

Bus subsystem 641 provides a mechanism for letting the various components and subsystems of computer system 610 communicate with each other as intended. Although bus subsystem 641 is shown schematically as a single bus, alternative embodiments of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as an example using a so-called particular computer adapted by programming instructions to perform as disclosed. Many other configurations of computer system 610 are possible having additional or fewer components than the computer system depicted in FIG. 6.

Figure 7:
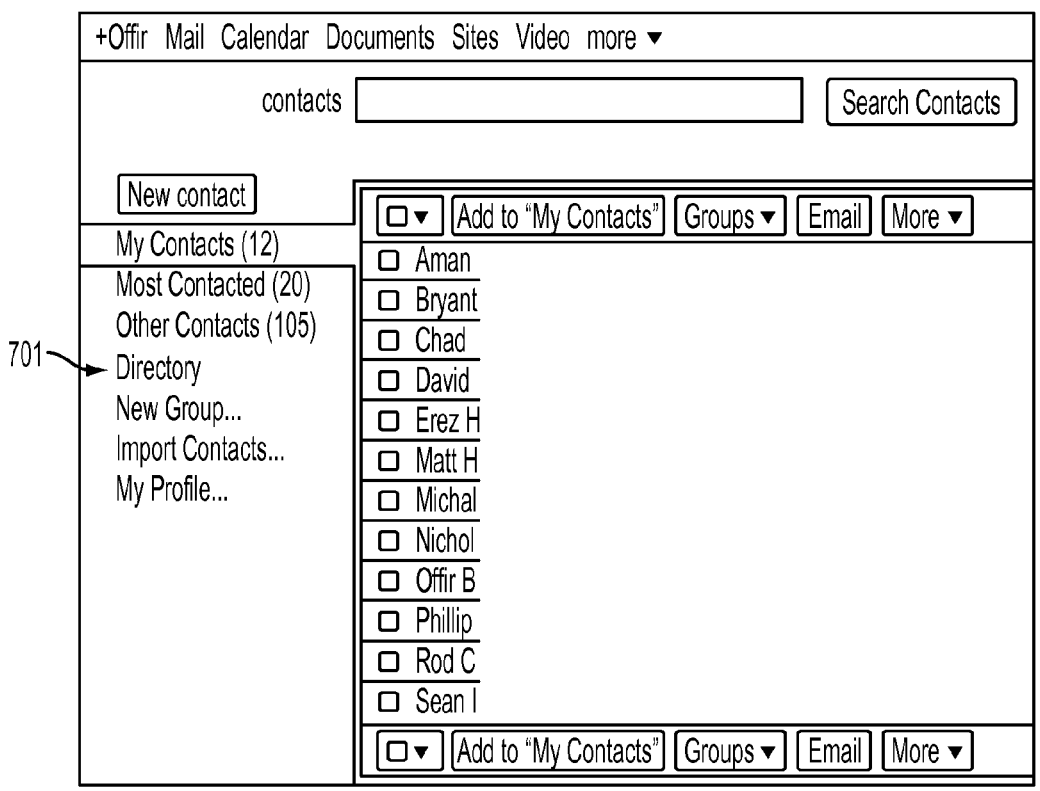
FIGS. 7-9 illustrate a graphical user interface on a client device that displays a contacts manager with a "directory" choice that supports browsing.
Figure 8:
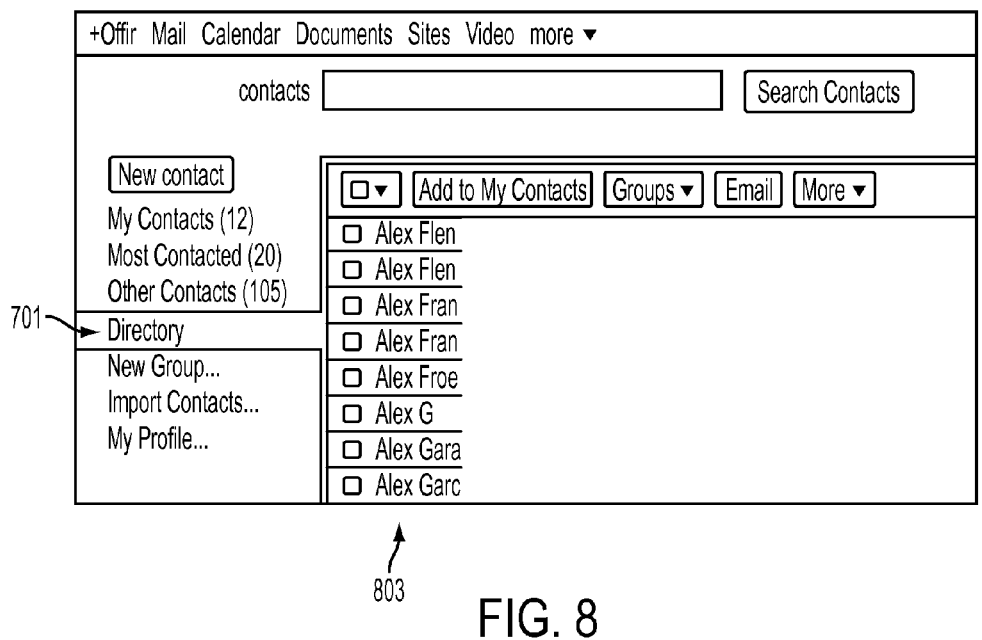
Figure 9:
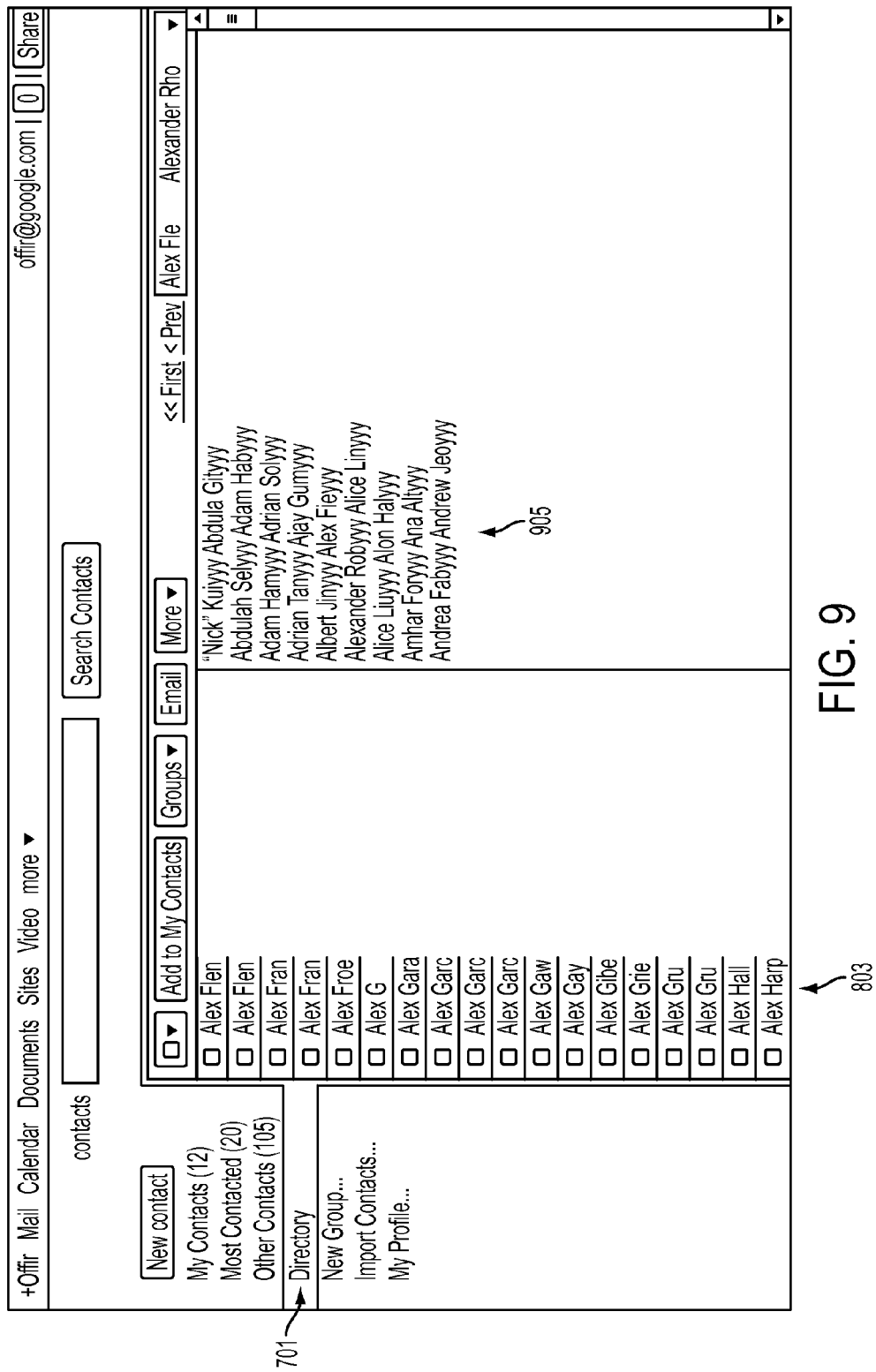

FIGS. 7-9 illustrate one implementation of a user interface that may be displayed by a client application on a client device in accordance with the embodiments described above. FIG. 7 illustrates a contacts manager with a "directory" choice 701 that supports browsing through a list of contacts. In FIG. 8, the user selects the directory and a list of available contacts 803 is displayed. Responsive to this selection, in FIG. 9, the system outputs to the user a table of selectable browsing ranges 905. In practice, real names may appear and the list could include the ranges for all of the available pages of contacts. For a large set of contacts, the selectable ranges might be hierarchical. For instance, the top level could be letters of the alphabet. Two or more hierarchical levels of selection could make it easier for a user to select among a large number of contacts. Another option, not shown, would be to allow a user to type a part of a name and have the selection list scroll automatically to that point. Or, upon typing part of a name, the first page of contacts that includes that string could be loaded and automatically scrolled to the position indicated by typing. Generally, upon typing part of a name, the first entry that matches can be displayed at or near the top of a list on the user's screen.

While the present invention is disclosed by reference to the implementations and examples detailed above, it is understood that these examples are intended in an illustrative rather than in a limiting sense. Computer-assisted processing is implicated in the described implementations. Accordingly, the present technologies may be embodied in methods for browsing large sets of contacts, systems including logic and resources browse large sets of contacts, systems that take advantage of computer-assisted methods for browsing or searching large sets of contacts, non-transitory memory impressed with logic to browse large sets of contacts, data streams impressed with logic to browse large sets of contacts, or computer-accessible services that carry out computer-assisted methods for browsing large sets of contacts. It is contemplated that modifications and combinations will be within the scope of the following claims.

The invention claimed is:

1. A method, comprising:
   maintaining, by a host service in a computer-readable memory, a collection of contacts, wherein each contact is associated with a domain and the collection comprises contacts from a plurality of domains;
   maintaining, by an index interface, an index comprising one or more tables, wherein each table contains a plurality of elements, and wherein each element points to a subset of the contacts that share a common attribute;
   receiving, via the host service, a first query to return at least one of the contacts in the collection, wherein the first query includes a domain and a first value;
   accessing the index to identify a first element having a domain that matches the domain of the first query and an attribute that matches the first value; and
   returning, in response to the first query, the contacts to which the first element points.

2. The method of claim 1, wherein the first value comprises a number of characters, and the method further comprises:
   receiving, by the host service, a second query to return at least one of the contacts in the collection, wherein the second query comprises the first value plus an additional character;
   accessing the index to identify a second element having a domain that matches the domain of the query and an attribute that matches the first value plus the additional character; and
   returning, in response to the second query, the contacts to which the second element points.

3. The method of claim 2, further comprising:
   receiving, by the host service, a third query, wherein the third query comprises at least a threshold number of characters;
   accessing the index to identify a third element having a domain that matches the domain of the query and an attribute that matches the characters in the third query;
   accessing a remote collection of contacts to identify an additional group of contacts having an attribute that matches the characters in the third query; and
   returning, in response to the third query, the contacts to which the third element points and the additional group of contacts identified from the remote collection.

4. The method of claim 3, wherein the contacts returned in response to the third query comprise a complete set of all contacts that match the third query.

5. The method of claim 1, wherein the first query comprises a browsing request, and the method further comprises:
   returning, in response to the first query, a plurality of selectable ranges within the returned contacts;
   receiving, from a client device, a selection of one of the selectable ranges; and
   returning, in response to the selection, a subset of the returned contacts that correspond to the selected range.

6. The method of claim 1, wherein the first query comprises a browsing request, the first value comprises a page number, and the method further comprises:
   causing a client device to display the returned contacts starting on the page number that corresponds to the first value.

7. The method of claim 1, further comprising, by a processor, generating the index by:
   processing the contacts in the collection to identify all contacts that correspond to a first domain;
   grouping all contacts that correspond to the first domain into a first subset;

processing the contacts in the first subset to identify all contacts having a data field whose first character values are identical;

grouping the contacts having a data field whose first character values are identical into a second subset;

processing the contacts in the second subset to identify all contacts whose first two character values in the data field are identical;

grouping the contacts having a data field whose first two character values in the data field are identical into a third subset; and saving the first, second and third subsets as tables in the index.

8. The method of claim 7, wherein saving the first, second and third subsets as tables in the index comprises:

partitioning the index into a plurality of logical storage units; and saving the storage units across multiple storage devices.

9. The method of claim 1, wherein each of the elements comprises a key that is associated with a domain and a key-value.

10. The method of claim 9, wherein a plurality of the key-values comprise a prefix that corresponds to first set of characters within a profiled data field for a plurality of the contacts in the collection.

11. The method of claim 9, wherein a plurality of the key-values comprise a term that corresponds to a full value of a profiled data field for a plurality of the contacts in the collection.

12. A hosted contacts system, comprising:

a first data store comprising a non-transitory computer-readable medium storing a collection of contacts, wherein each contact is associated with a domain and the collection comprises contacts from a plurality of domains;

an index interface storing an index comprising one or more tables, wherein each table contains a plurality of elements, and wherein each element points to a subset of the contacts that share a common attribute; and at least one server containing a processor and programming instructions that, when executed, cause the processor to:

receive, from a client device, a first query to return at least one of the contacts in the collection, wherein the first query includes a domain and a first value, access the index to identify a first element having a domain that matches the domain of the first query and an attribute that matches the first value, return, in response to the first query, the contacts to which the first element points, and execute a command to transmit, to the client device, information corresponding to the returned contacts.

13. The system of claim 12, further comprising:

a second data store comprising a non-transitory computer-readable medium storing a second collection of contacts, wherein all contacts associated with a first domain are stored in the first data store and all contacts associated with a second domain are stored in the second data store; and a second index interface storing a second index comprising one or more tables, wherein each table in the second index contains a plurality of elements, each of which points to a subset of the contacts in the second data store.

14. The system of claim 12, wherein the first value comprises a number of characters, and the system also comprises programming instructions that, when executed, cause the processor to:

receive a second query to return at least one of the contacts in the collection, wherein the second query comprises the first value plus an additional character;

access the index to identify a second element having a domain that matches the domain of the query and an attribute that matches the first value plus the additional character; and return the contacts to which the second element points.

15. The system of claim 13, wherein the system also comprises programming instructions that, when executed, cause the processor to:

receive a third query, wherein the third query comprises at least a threshold number of characters;

access the index to identify a third element having a domain that matches the domain of the query and an attribute that matches the characters in the third query;

access a remote collection of contacts to identify an additional group of contacts having an attribute that matches the characters in the third query; and return, in response to the third query, the contacts to which the third element points and the additional group of contacts identified from the remote collection.

16. The system of claim 12, wherein the system also comprises programming instructions that, when executed, cause the processor to:

determine that the first query is a browsing request;

return, in response to the first query, a plurality of selectable ranges within the returned contacts;

receive a selection of one of the selectable ranges; and return, in response to the selection, a subset of the returned contacts that correspond to the selected range.

17. The system of claim 12, wherein the system also comprises programming instructions that, when executed, cause the processor to:

process the contacts in the collection to identify all contacts that correspond to a first domain;

group all contacts that correspond to the first domain into a first subset;

process the contacts in the first subset to identify all contacts having a data field whose first character values are identical;

group the contacts having a data field whose first character values are identical into a second subset;

process the contacts in the second subset to identify all contacts whose first two character values in the data field are identical;

group the contacts having a data field whose first two character values in the data field are identical into a third subset; and save the first, second and third subsets as tables in the index.

18. The system of claim 17, wherein the system also comprises programming instructions that, when executed, cause the processor to:

partition the index into a plurality of logical storage units for storage across multiple storage devices.

19. The system of claim 12, wherein:

each of the elements comprises a key that is associated with a domain and a key-value; and a plurality of the key-values comprise one or more of the following:

a prefix that corresponds to first set of characters within a profiled data field for a plurality of the contacts in the collection, and a term that corresponds to a full value of a profiled data field for a plurality of the contacts in the collection.

20. A method, comprising:
- maintaining, by a host service in a computer-readable memory, a collection of contacts, wherein each contact is associated with a domain and the collection comprises contacts from a plurality of domains;
- maintaining, by, an index interface, an index comprising one or more tables, wherein:
  - each table contains a plurality of elements,
  - each element points to a subset of the contacts that share a common attribute,
  - each of the elements comprises a key that is associated with a domain and a key-value,
  - a plurality of the key-values comprise a prefix that corresponds to at least a first set of characters within a profiled data field for a plurality of the contacts in the collection;
- receiving, via the host service, a first query to return at least one of the contacts in the collection, wherein the first query includes a domain and a first value comprising a plurality of characters;
- accessing the index to identify a first element having a domain that matches the domain of the first query and an attribute that matches the first value; and
- returning, in response to the first query, the contacts to which the first element points;
- receiving, by the host service, a second query to return at least one of the contacts in the collection, wherein the second query comprises the first value plus an additional character;
- accessing the index to identify a second element having a domain that matches the domain of the query and an attribute that matches the first value plus the additional character; and
- returning, in response to the second query, the contacts to which the second element points.

21. The method of claim 20, further comprising:
- receiving, by the host service, a third query, wherein the third query comprises at least a threshold number of characters;
- accessing the index to identify a third element having a domain that matches the domain of the query and an attribute that matches the characters in the third query;
- accessing a remote collection of contacts to identify an additional group of contacts having an attribute that matches the characters in the third query; and
- returning, in response to the third query, the contacts to which the third element points and the additional group of contacts identified from the remote collection.

\* \* \* \* \*